United States Patent [19]

Benschneider et al.

[11] Patent Number: 4,862,405

[45] Date of Patent: Aug. 29, 1989

[54] APPARATUS AND METHOD FOR EXPEDITING SUBTRACTION PROCEDURES IN A CARRY/SAVE ADDER MULTIPLICATION UNIT

[75] Inventors: Bradley J. Benschneider, Findlay, Ohio; Victor Peng, Shrewsbury, Mass.

[73] Assignee: Digital Equipment Corporation, Maynard, Mass.

[21] Appl. No.: 68,262

[22] Filed: Jun. 30, 1987

[51] Int. Cl.[4] ............................................. G06F 7/50
[52] U.S. Cl. ................................................... 364/760
[58] Field of Search ......................................... 364/760

[56] References Cited

U.S. PATENT DOCUMENTS

| | | | |
|---|---|---|---|
| 3,372,269 | 3/1968 | MacSorley et al. | 364/760 |
| 4,041,292 | 8/1977 | Kindell | 364/760 |
| 4,228,520 | 10/1980 | Letteney et al. | 364/760 |
| 4,484,301 | 11/1984 | Borgerding et al. | 364/760 |
| 4,646,257 | 2/1987 | Essig et al. | 364/760 |
| 4,752,905 | 6/1988 | Nakagawa et al. | 364/760 |

Primary Examiner—David H. Malzahn
Attorney, Agent, or Firm—William W. Holloway; William C. Cray

[57] ABSTRACT

In a multiplier unit implemented with carry/save adder stages and executing a modified Booth algorithm, the signals, required to complete the 2's complement in order to perform a subtraction operation during the multiplication procedure using carry/save adder cells, are entered in the first carry/save stage in the appropriate carry/save cell positions. In this manner, one less signal is processed by the time-critical least significant cell associated with each carry/save adder stage, thereby reducing the overall time delay associated with the multiplier unit and accelerating the multiplication operation.

20 Claims, 5 Drawing Sheets

| MULTIPLIER BITS | DESIGNATION | OPERATION |
|---|---|---|
| 000 | 0 | |
| 001 | +1x | ADD 1 TIMES MULTIPLICAND |
| 010 | +1x | ADD 1 TIMES MULTIPLICAND |
| 011 | +2x | ADD 2 TIMES MULTIPLICAND |
| 100 | −2x | SUBTRACT 2 TIMES MULTIPLICAND |
| 101 | −1x | SUBTRACT 1 TIMES MULTIPLICAND |
| 110 | −1x | SUBTRACT 1 TIMES MULTIPLICAND |
| 111 | 0 | |

MULTIPLIER = .10101011
MULTIPLICAND = .10000001
RECODED MULTIPLIER IS 1.(-1)(-1)(-1)(-1)(-1)

(PRIOR ART)
INITIAL CSA INPUTS:

|  | CSA INPUTS | LSC INPUTS |
|---|---|---|
| INITIAL CARRY | 00.00000000 | 0* |
| INITIAL SUM | 00.00000000 | 00 |
| 1'S COMPLEMENT | 11.01111110 | ** |
| LSC CARRY IN |  | 0 |
| 2'S COMPLEMENT |  | 0 |
| NEW CARRY | 00.00000000 | 000 |
| NEW SUM | 11.01111110 | 0 |
| LSC CARRY OUT |  |  |

SECOND CSA INPUTS:

|  | CSA INPUTS | LSC INPUTS |
|---|---|---|
| SHIFTED CARRY | 00.00000000 | 0* |
| SHIFTED SUM | 11.11011111 | 10 |
| 1'S COMPLEMENT | 11.01111110 | ** |
| LSC CARRY IN |  | 0 |
| 2'S COMPLEMENT |  | 1 |
| NEW CARRY | 11.01011110 | 011 |
| NEW SUM | 00.10100001 | 0 |
| LSC CARRY OUT |  |  |

(PRESENT INVENTION)
INITIAL CSA INPUTS:

|  | CSA INPUTS | LSC INPUTS |
|---|---|---|
| INITIAL CARRY | 00.0000000* | 0* |
| INITIAL SUM | 00.01010101 | 00 |
| 1'S COMPLEMENT | 11.01111110 | ** |
| LSC CARRY IN |  | 0 |
| NEW CARRY | 00.01010100 | 000 |
| NEW SUM | 11.00101011 | 0 |
| LSC CARRY OUT |  |  |

SECOND CSA INPUTS:

|  | CSA INPUTS | LSC INPUTS |
|---|---|---|
| SHIFTED CARRY | 00.00101010 | 0* |
| SHIFTED SUM | 11.11001010 | 11 |
| 1'S COMPLEMENT | 11.01111110 | ** |
| LSC CARRY IN |  | 0 |
| NEW CARRY | 11.01101010 | 011 |
| NEW SUM | 00.10011110 | 0 |
| LSC CARRY OUT |  |  |

FINAL CPA INPUTS:

| SHIFTED CARRY | 01.0010101* |
|---|---|
| SHIFTED SUM | 11.00101011 |
| LSC CARRY IN | 1 |

FINAL RESULT: 00.01010110

FIG. 6.

APPARATUS AND METHOD FOR EXPEDITING SUBTRACTION PROCEDURES IN A CARRY/SAVE ADDER MULTIPLICATION UNIT

RELATED APPLICATION

This application is related to the following U.S. Patent Application.

APPARATUS AND METHOD FOR PERFORMING A SHIFT OPERATION IN A MULTIPLIER ARRAY; invented by Gilbert M. Wolrich, Edward J. McLellan and Robert A. J. Yodlowski; having Ser. No. 050,749; filed on May 15, 1987; and assigned to the assignee of the present U.S. Patent Application.

BACKGROUND OF THE INVENTION

1. Field of the Invention

This invention relates generally to data processing systems and, more particularly, to execution of the multiplication procedure by a data processing system.

2. Description of the Related Art

Data processing systems typically employ an array of carry/save adders to execute the multiplication procedure. A block diagram of apparatus used in performing this multiplication procedure is shown in FIG. 1. Register 101 contains the multiplicand operand, while register 102 contains the multiplier operand. For this exemplary apparatus, the operands are assumed to be 8 bits in length. The multiplication apparatus includes a first carry/save adder stage 111, a second carry/save adder stage 112, a third carry/save adder stage 113 and a fourth carry/save adder stage 114. In the exemplary apparatus illustrated in FIG. 1, a shift of two bit positions is assumed between each carry/save adder stage (i.e., a two bit retirement algorithm is used). Each carry/save adder stage includes a multiplicity of carry/save adder cells, in the present example 8 carry/save adder cells are used in each stage.

Referring now to FIG. 2, (for the modified Booth's 2 bit retirement algorithm) each carry/save adder cell 20 has a CARRY(n+1) signal from the prior carry/save adder stage, a SUM(n+2) signal from the prior carry/save adder stage and a MULTIPLICAND(n) signal applied thereto and, in response to control signals, provides a SUM(n) signal and a CARRY(n) signal. (Each carry/save adder cell is associated with a multiplicand bit position n.)

Referring again to FIG. 1, each multiplicand register 101 cell is applied to a corresponding carry/save adder cell in each of the carry/save adder stages. In FIG. 1, this coupling is illustrated for the $7^{th}$ bit position of multiplicand register 101 which is coupled to the $7^{th}$ bit position carry/save adder cell of the first carry/save adder stage 111, the $7^{th}$ bit position carry/save adder cell of the second carry/save adder stage 112, the $7^{th}$ bit position carry/save adder cell of the third carry/save adder stage 113 and the $7^{th}$ bit position carry/save adder cell of the fourth carry/save adder stage 114. In the illustrative example of FIG. 1, the two bit position shift between the carry/save adder stages in indicated in FIG. 1 by the application of the SUM (S) signal from carry/save adder cell bit position 5 to the carry/save adder cell bit position 3 of the next succeeding carry/save adder stage and by the application of the CARRY (C) signal from carry/save adder cell bit position 5 to the carry/save adder cell at bit position 4 of the next succeeding carry/save adder stage (i.e., from carry/save adder stage 111 to carry/save adder stage 112, etc.).

The two position shifting of signals between the carry/save adder stages is the result of using a procedure generally referred to as the modified Booth 2 bit retirement algorithm. In this procedure, a plurality (2 bits in the present example) of remaining least significant multiplier operand bits multiply the multiplicand operand in a single operation (i.e., are retired in a single operation). This operation is performed by encoding (or recoding the two multiplier bits into appropriate control signals in encoding apparatus 141, 142, 143 and 144, each encoding apparatus being associated with a carry/save adder stage (111, 112, 113 and 114 respectively). (As will be known to those familiar with the modified Booth algorithm, the remaining three least significant bits are used to determine the control signals even though only the two least significant bits are retired.) Referring to FIG. 3, the relationship between the three multiplier bits and the operation of the carry/save adder cell resulting from the control signals is illustrated. Of particular importance to the present invention is the requirement of the subtraction operation for certain multiplier operand signal groups. In order to implement the subtraction operation with the carry/save adder cells, the 2's complement subtraction algorithm is used. When the encoding apparatus 141 to 144 determines that a subtraction operation is to be performed in the associated carry/save adder logic (111 through 114 respectively), a 1's complement signal group is formed from the multiplicand operand and the logic signal, to complete the 2's complement of the multiplicand operand, is applied to the least significant bit position associated with the multiplicand operand.

Referring once again to FIG. 1, the shifting operation causes a portion of the operand field to be removed therefrom. To insure the accuracy of the multiplication procedure, least significant cells 151, 152, 153 and 154 are used to process signals, otherwise removed from the operand field, but which can contribute to the result. In the preferred embodiment, the least significant cell is a two bit adder cell. The least significant cell receives the SUM signals from the $0^{th}$ and $1^{st}$ carry/save adder stage bit positions from the prior carry/save adder stage, the CARRY signal from the $0^{th}$ bit position from the prior carry/save adder stage, the overflow signal from the preceding least significant cell and the logic signal needed to provide the 1's complement signal group, generated on the fly in the preferred embodiment, into a 2's complement signal for the prior carry/save adder stage. In the shifting of the signals from the carry/save adder stage, the least significant bit position associated with the multiplicand register is entered into the least significant cell and the application of the 2's complement logic signal thereto is equivalent to applying the 2's complement logic signal to the least significant position of the next preceding carry/save adder stage. The signals from the fourth carry/save adder stage 114 and the fifth least significant cell 154 are applied to the carry/sum combining network 130 wherein an 8 bit result operand is formed. (Least significant bit cell 150 is shown with dotted lines in FIG. 1 because all of the input signals thereto are zero.)

The multiplier circuit of FIG. 1 has several advantages. Only in carry/sum combining network 130 are the CARRY signals and the SUM signals combined into a single operand with the potentially slow carry propagation process. The use of the modified Booth algorithm reduces the number of operations performed on the operand and reduces the number of elements to implement the multiplication operation. However, the multiplication process has the limitation of potentially requiring the processing of five input signals by the least significant cell.

A need has therefore been felt for accelerating the potentially slowest portion of the multiplication procedure, which is the combination of signals in the least significant cell associated with each carry/save stage.

FEATURES OF THE INVENTION

It is an object of the present invention to provide an improved data processing system.

It is a feature of the present invention to provide an improved technique for execution of the multiplication operation in a data processing system.

It is a further feature of the present invention to apply the logic signal(s) required to convert a 1's complement operand (or operand) into a 2's complement operand in an initial carry/save adder stage.

It is a still further feature of the present invention to accelerate the multiplication operation by reducing the number of signals processed by a least significant cell associated with a carry/save adder stage.

SUMMARY OF THE INVENTION

The aforementioned and other features are accomplished, according to the present invention, by a multiplication unit implemented by a plurality of carry/save adder stages and executing the multiplication procedure through the use of the modified Booth algorithm. When the encoded multiplier bits indicate a subtraction operation is required, the single logic "1" signal needed to convert a 1's complement signal group derived from the multiplicand operand into a 2's complement signal group in order to execute the subtraction operation by means of addition operation is entered, for all subtraction operations, into the first carry/save adder stage at the appropriate bit positions. The appropriate bit positions are determined by the position where the logic signals would be entered in the least significant cell, account being taken to the position shifts between equivalent positions in the first carry/save adder stage cell and the least significant cells. For the first carry/save adder stage, both the input CARRY signal terminals and the input SUM signal terminals are unused and can be used to enter the 2's complement signal(s) into the first carry/save adder stage.

These and other features of the present invention will be understood upon reading of the following description along with the drawings.

BRIEF DESCRIPTION OF THE DRAWINGS

FIG. 6 illustrates portions of an example of modified Booth's algorithm multiplication according to the prior art and according to the present invention.

DESCRIPTION OF THE PREFERRED EMBODIMENT

DETAILED DESCRIPTION OF THE FIGURES

Figure 1:
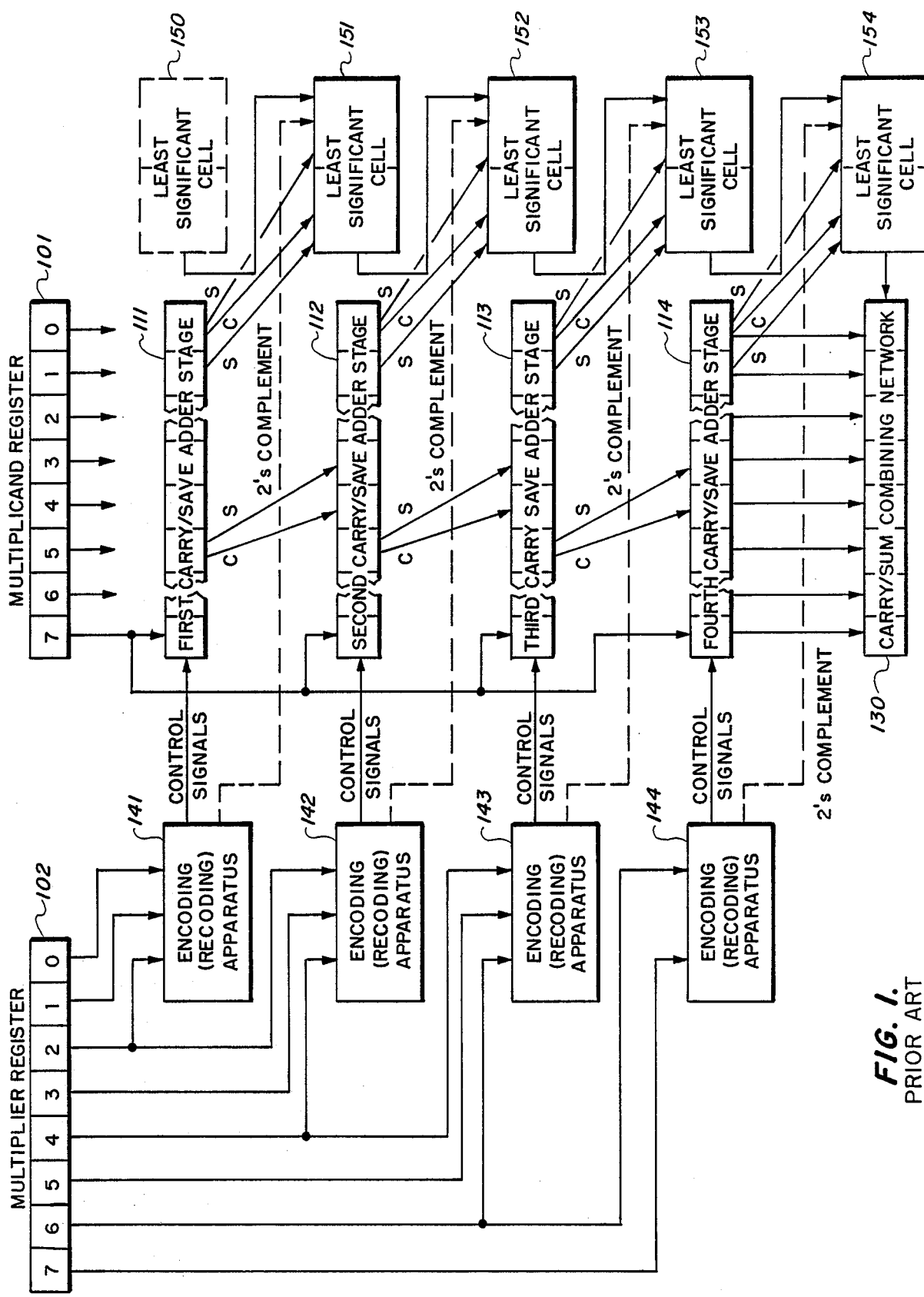
FIG. 1 is a block diagram illustrating the apparatus used in executing a multiplication procedure.
Figures 2, 3:
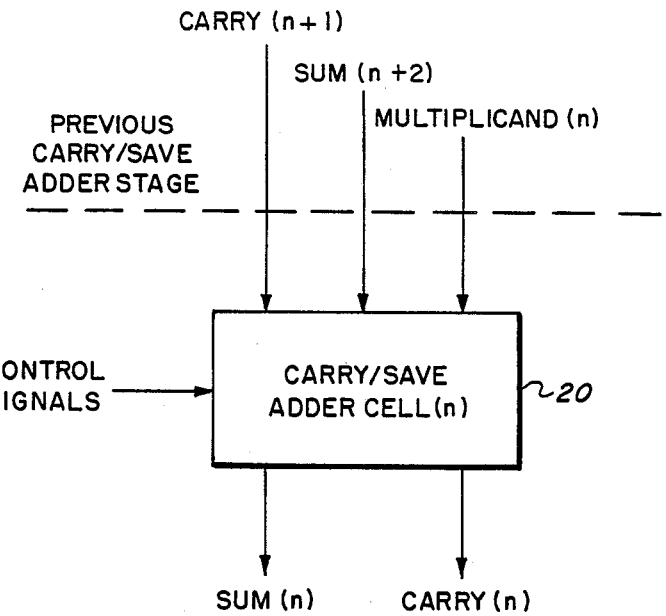
FIG. 2 is a diagram illustrating the signals applied to and derived from a carry/save adder cell.
FIG. 3 is a table of multiplier bit groups and the corresponding operations for the carry/save adder stages for the modified Booth's 2 bit retirement algorithm.

FIG. 1, FIG. 2 and FIG. 3 have been discussed with reference to the related art.

Figure 4:
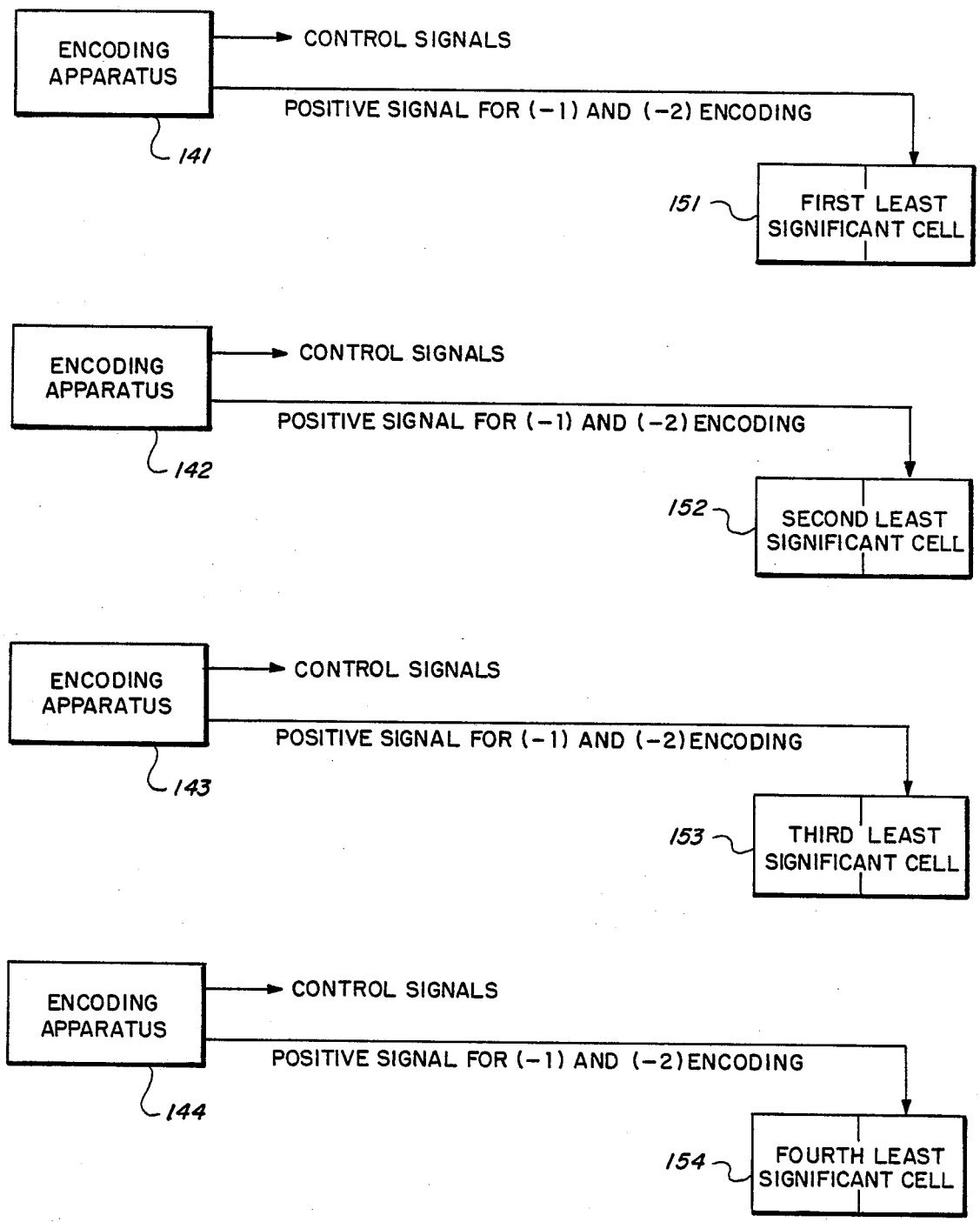
FIG. 4 is a block diagram of selected elements of FIG. 1 indicating how the additional logic "1" signal required for the completion of the 2's complement of the multiplicand operand is entered in the multiplication unit according to the prior art.

Referring next to FIG. 4, the technique for entering the additional logic "1" signal required to complete the 2's complement of the multiplicand operand according to the prior art is illustrated. The encoding apparatus, in response to associated signals from the multiplier operand, determines what operation is to be performed on the multiplicand operand by the associated carry/save adder stage. When this operation is a subtraction of one or two times the multiplicand operand, then the carry/save adder stages generate a 1's complement of the multiplicand operand (by inverting the logic input signals to the carry/save adder cells) and adds the 1's complement signal group to the SUM and CARRY signals. Because the correct subtraction procedure requires that 2's complement signal group be used, the additional logic "1" signal required for generation of the 2's complement signal group is added to the least significant bit position of the associated least significant cell (i.e., the least significant cell position into which the signal in the least significant carry/save adder stage of the next preceding carry/save adder stage will be shifted). When the associated bit group from the multiplier operand requires a subtraction of one times or two times the multiplicand operand, each encoding apparatus 141, 142, 143 and 144 applies a positive signal to the input terminals of the least significant bit position of the least significant cell 151, 152, 153 and 154, respectively. As will be clear, entry in this location is equivalent to entry in the least significant carry/save array position of the signal associated with the least significant bit position of the multiplicand operand. As was discussed with reference to FIG. 1, this logic "1" signal is a fifth signal that can be applied to the least significant bit cell.

Figure 5:
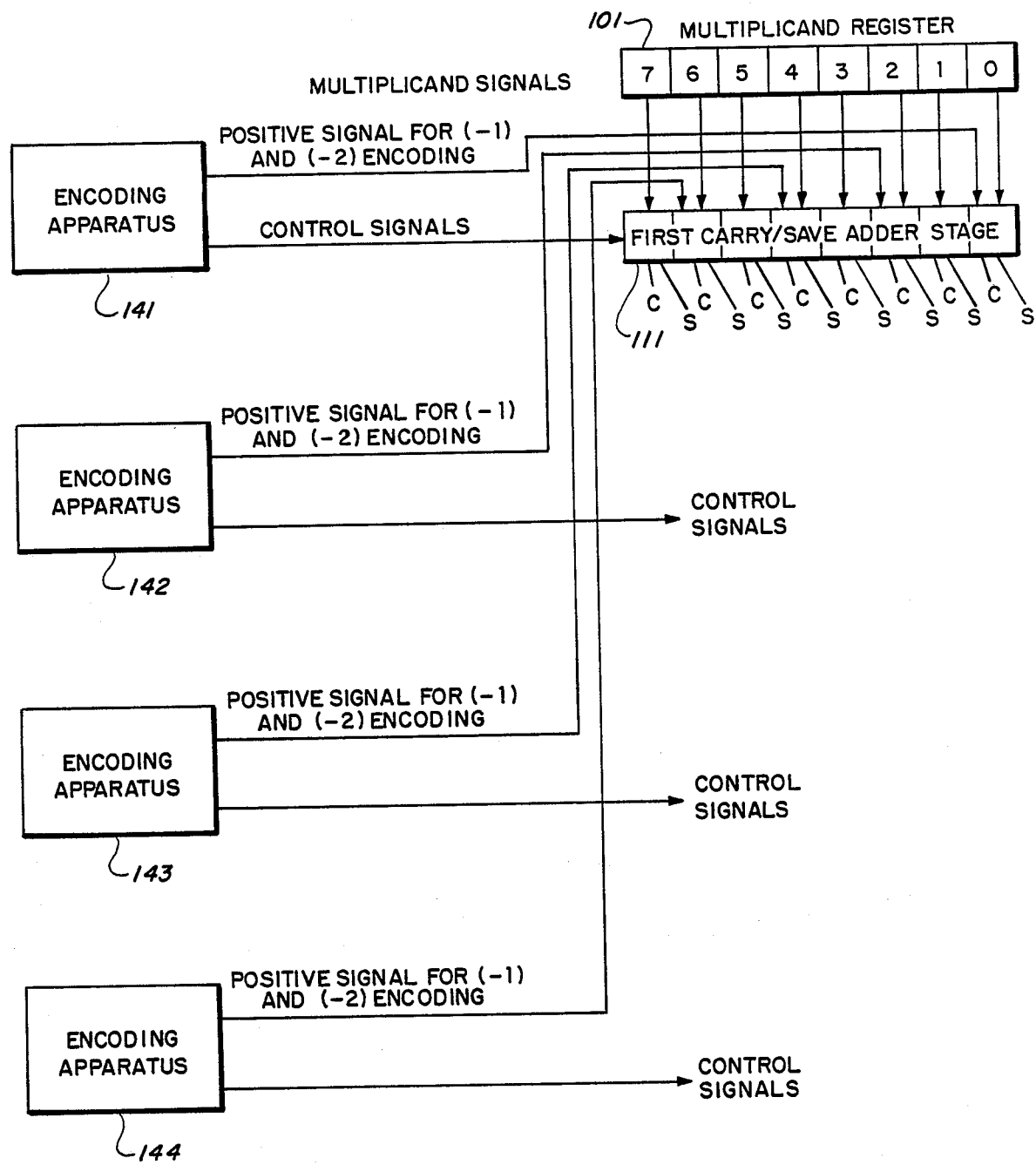
FIG. 5 is a block diagram of selected elements of FIG. 1 illustrating how the additional logic "1" signal required to complete the 2's complement of the mulitplicand operand is entered in the multiplier unit according to the present invention.

Referring next to FIG. 5, the entry of the logic "1" signal to complete the 2's complement of the multiplicand operand according to the present invention is illustrated. As in the implementation in FIG. 4, the presence of specified groups of multiplier operand signals causes the encoding apparatus 141, 142, 143 and 144 to provide a positive output signal when the recoding requires a times one or "times two" subtraction operation. The positive output signals are applied to appropriate unused terminals of the first carry/save adder stage, both the CARRY signal input terminals and the SUM signal input terminals being unused. The particular carry/save adder cell to which the logic "1" signal is added is the cell associated with the least significant bit of each recoded signal group. As illustrated in FIG. 5, the positive signal from the encoding apparatus 141 is applied to the $0^{th}$ cell of the first carry/save adder stage 111. A positive signal from encoding apparatus 142 is applied to the $2^{nd}$ cell of the first carry/save adder stage, a positive signal from encoding apparatus 143 is applied to the 4th cell and a positive signal from encoding apparatus 144 is applied to the 6th cell of first carry/save adder stage 111. As will be clear, the position at which the logic "1" signal is entered in the first carry/save adder circuit is the corresponding position to where the signals are entered in the least significant bit cell.

Referring next to FIG. 6, a partial comparison of the use of the modified Booth's algorithm multiplication according to the prior art and according to the present invention is shown. The multiplier operand (0.10101011) is recoded as 1.(−1) (−1) (−1) (−1) (somewhat differently than illustrated in FIG. 1). The input signals to the first carry/save adder stage 111 (CSA) for the two techniques demonstrates that the present invention enters the 2's complement signals into the stage by means of the SUM (S) input terminals. The first carry/save adder stage 111 used in conjunction with the prior art receives only the (1's) complement signals of the multiplicand operand. Least significant cell 151 receives signals from the first carry/save adder stage 111 and the 2's complement signal resulting from the presence of the first recorded (−1) group of multiplier operand. In the present invention, the 2's complement signal has already been entered, thereby reducing the number of signals applied to the least significant cell. The remaining carry/save adder and least significant cell signals can be determined in a similar manner. The signals for only two carry/save adder stages is shown, however, the remaining signals can be determined in an analogous manner. The signals applied to the carry/sum combining network (CPA) 130 are identical, whether the technique of the prior art or the technique of the present invention is used.

OPERATION OF THE PREFERRED EMBODIMENT

The present invention accelerates the multiplication procedure by eliminating one input signal to the least significant cell associated with each carry/save adder stage that is required when the multiplier unit must execute a subtraction operation in response to selected multiplier bit groups used in recoding (encoding) the multiplier operand for use with the modified Booth algorithm. Instead of adding the appropriate logic "1" signal needed to complete the multiplicand operand's 2's complement of the multiplicand operand to the associated least significant cell, the present invention enters all of the 2's complement additional logic "1" signals to the first carry/save adder stage. Because the CARRY signal and SUM signal input terminals are not used by the first carry/save adder stage, these input terminals are available for signal entry. Entry of the logic "1" signals in this manner reduces the number of input signals to each least significant cell by one, thereby expediting the multiplication procedure.

Because the carry/save adder stage implementation of the multiplication operation uses addition operations, and because the addition operation is commutative, the insertion of logic signals to convert a 1's complement operand to a 2's complement operand provides the same result whether the logic signals ae inserted in the first carry/save adder unit or in the least significant bit cell. This equality can be demonstrated by working through the example begun in FIG. 6. The only requirement is that the position of insertion in the operand be equivalent in either circumstance.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A multiplier unit capable of implementing a modified Booth algorithm, said multiplier unit comprising:
   a multiplier storage means for storing a multiplier operand;
   a multiplicand storage means for storing a multiplicand operand;
   a plurality of sequential carry/save adder means coupled to said multiplicand storage means and a next previous carry/save adder stage, each carry/save adder means for performing a processing operation on said multiplicand operand and combining an internal operand resulting from said processing operation with a processed operand from a next previous carry/save adder stage, wherein said processed operand is shifted a preestablished amount between said next previous carry/save adder stage and said carry/save adder stage;
   a plurality of encoding means coupled to said multiplier operand storage means and responsive to said multiplier operand for applying control signals to an associated carry/save adder means, said control signals determining said processing operation of said associated carry/save adder means, each of said plurality of encoding means generating a positive logic signal when said control signals result in a subtraction processing operation in said associated carry/save adder means, wherein said positive logic signal is entered in a first carry/save adder stage at a predetermined position and combined with said multiplicand operand in said first carry/save adder means, and
   combining means for combining signals from a last carry/save adder means.

2. The multiplier unit of claim 1 wherein said predetermined position is a position of least significant bit position of a carry/save adder means receiving control signals associated with said positive logic signal prior to shifting said processed operand during transfer between carry/save adder stages.

3. The multiplier unit of claim 2 wherein said control signals causing a subtraction processing operation by said carry/save adder means result in a 1's complement processing operation.

4. The multiplier unit fo claim 3 wherein said positive logic signal is a logic signal for causing said 1's complement processing operation to provide a 2's complement processing operation.

5. The multiplier unit of claim 4 further comprising a plurality of least significant cells, each of said least significant cells associated with a one of said carry/save adder means, said each least significant cell receiving signals from a least significant bit position cell of a next prior carry/save adder means, wherein said predetermined position is determined by a position of an associated least significant cell.

6. The method of implementing a modified Booth's algorithm in a multiplier unit for multiplying a multiplicand operand by a multiplier operand, said multiplier unit having a plurality of carry/save adder stages arranged in a sequence, each of said carry/save adder stages including an array of carry/sve adder units, said method comprising the steps of:

recoding a multiplier operand to obtain control signals for each of said carry/save adder stages;

performing a sequential processing operation on said multiplicand operand in response to said control signals by said each carry/save adder stage;

combining said multiplicand operand on which said processing operation was performed with an operand from a next prior carry/save adder stage, said next prior carry/save adder stage operand being shifted relative to said multiplicand operand a preestablished number of bit positions;

when said control signals from said recoding step indicate that a subtraction operation is performed by an associated carry/save adder stage, generating a positive logic signal;

adding said positive logic signal to predetermined position of a processed multiplicand operand in a first carry/save adder stage; and performing a 1's complement processing operation on a multiplicand operand in response to said control signals applied to a carry/save adder stage receiving control signals associated with said positive logic signal; and combining logic signals from a last carry/save adder stage to provide a resultant operand.

7. The method of implementing a modified Booth's algorithm in a multiplier unit of claim 6 wherein said adding said positive logic signal step and said performing a 1's complement step provide a two's complement operation.

8. The method of implementing a modified Booth's algorithm in a multiplier unit of claim 7 wherein said recoding step includes a step of providing said control signals in response to selected multiplier operand bit position signals.

9. The method of implementing a modified Booth's algorithm of claim 8 wherein said adding said positive logic signal step includes a step of entering said positive logic signal in a bit position of said first carry/save adder stage equivalent to the least significant position of said carry/save adder stage performing said 1's complement processing operation prior to shifting of processed operands.

10. The method of implementing a modified Booth's algorithm of claim 8 further including a step of entering said positive logic signal in a carry/save adder unit associated with said predetermined bit position in said first carry/save adder stage by means of a terminal selected from a SUM signal input terminal and a CARRY signal input terminal of said carry/save adder unit.

11. Apparatus for executing a multiplication operation using a modified Booth's algorithm, said apparatus comprising:

first storage means for storing a multiplier operand;

second storage means for storing a multiplicand operand;

an ordered plurality of carry/save adder stages, wherein each of said carry/save adder stages receives said multiplicand operand, said each carry/save adder stages including an array of carry/save adder cells, said each carry/save adder stage performing a one of a sequence of processing operations on said multiplicand operand, said each carry/save adder stage combining a processed multiplicand operand and an output operand from a next prior carry/save adder stage, each of said output operands shifted a preestablished number of bit positions when applied to a next sequential carry/save adder stage;

a plurality of encoding means, each of said encoding means coupled to a carry/save adder stage and coupled to said first storage means, said encoding means applying control signals to said coupled carry/save adder stage, said control signals determining said processing operation on said multiplicand operand entered in said coupled carry/save adder stage, wherein said control signals are determined by selected signal groups of said multiplier operand, said encoding means applying a logic signal with a selected position of a first carry/save adder stage in response to preselected multiplier operand signal groups, said preselected signal groups identifying a subtraction operation by said coupled carry/save adder stage on said multiplicand operand; and combining means for combining signals from a last carry/save adder stage to provide a resulting operand.

12. The apparatus for executing a multiplication operation of claim 11 wherein said preselected multiplier operand signal groups cause a 1's complement processing operation to be performed by a coupled carry/save adder stage.

13. The apparatus for executing a multiplication operation of claim 12 wherein combining said logic signal in said first carry/save adder unit converts said 1's complement multiplicand processing operation to a 2's complement multiplicand processing operation.

14. The apparatus for executing a multiplication operation of claim 13 wherein said selected position is determined by a least significant bit position of a carry/save adder stage prior to shifting of output operands between said carry/save adder stages.

15. The apparatus for executing a multiplication operation of claim 14 wherein output signals from a carry/save adder stage include a SUM signal and a CARRY signal associated with each bit position.

16. The apparatus for executing a multiplication operation of claim 15 further comprising a least significant cell associated with each carry/save adder stage; said least significant cell combining shifted SUM signals from a least significant bit position of a next prior carry/save adder stage, at least one shifted CARRY signal from said next previous carry/save adder stage, and an overflow signal from a next previous least significant cell.

17. The apparatus for executing a multiplication operation of claim 16 wherein said apparatus implements a two bit retirement Booth's algorithm, a SUM signal being shifted by two less significant positions from a one carry/save adder stage to a next consecutive carry/save adder stage, wherein a CARRY signal is shifted by one less significant position from said one carry/save adder stage to said second carry/save adder stage.

18. The apparatus for executing a multiplication operation of claim 17 wherein said least significant cells are two bit adder units.

19. The apparatus for executing a multiplication operation of claim 18 further comprising combination means for combining signals from a last carry/save adder stage and a last least significant cell into a final result operand.

20. The apparatus for executing a multiplication operation of claim 19 wherein said encoding means is responsive to preestablished three bit signals of said multiplier operand.

* * * * *